(12) United States Patent
Rekow (10) Patent No.: US 6,773,142 B2
(45) Date of Patent: Aug. 10, 2004

(54) APPARATUS FOR PROJECTING A LINE OF LIGHT FROM A DIODE-LASER ARRAY

(75) Inventor: Mathew N. Rekow, Santa Cruz, CA (US)

(73) Assignee: Coherent, Inc., Santa Clara, CA (US)

( * ) Notice: Subject to any disclaimer, the term of this patent is extended or adjusted under 35 U.S.C. 154(b) by 156 days.

(21) Appl. No.: 10/043,036

(22) Filed: Jan. 7, 2002

(65) Prior Publication Data

US 2003/0128543 A1 Jul. 10, 2003

(51) Int. Cl.[7] ............................................. F21K 27/00
(52) U.S. Cl. .................. 362/259; 362/268; 362/331; 362/335; 235/462.35; 359/619
(58) Field of Search ................. 362/259, 268, 362/331, 335; 235/462.35; 359/621, 622, 623, 668, 671, 619, 628

(56) References Cited

U.S. PATENT DOCUMENTS

| | | | | |
|---|---|---|---|---|
| 4,497,015 A | * | 1/1985 | Konno et al. ............... | 362/268 |
| 4,619,508 A | * | 10/1986 | Shibuya et al. ............. | 353/122 |
| 5,594,526 A | * | 1/1997 | Mori et al. .................. | 355/67 |
| 5,610,763 A | * | 3/1997 | Kudo ......................... | 359/619 |
| 5,923,475 A | | 7/1999 | Kurtz et al. ................ | 359/619 |
| 6,291,320 B1 | | 9/2001 | Yamazaki et al. .......... | 438/487 |
| 6,411,440 B2 | * | 6/2002 | Ohuchi et al. ............. | 359/621 |
| 6,421,178 B1 | * | 7/2002 | Lissotschenko et al. .... | 359/559 |
| 6,431,727 B1 | * | 8/2002 | Sugawara et al. .......... | 362/244 |
| 6,478,452 B1 | * | 11/2002 | Richardson et al. ........ | 632/268 |
| 6,494,371 B1 | * | 12/2002 | Rekow et al. .............. | 235/454 |
| 6,499,845 B2 | * | 12/2002 | Sato ........................... | 353/38 |
| 6,505,957 B2 | * | 1/2003 | Chuang ..................... | 362/268 |

* cited by examiner

Primary Examiner—Sandra O'Shea
Assistant Examiner—Jacob Y. Choi
(74) Attorney, Agent, or Firm—Stallman & Pollock LLP (57) ABSTRACT

Apparatus for projecting a line of light includes a linear array of diode-lasers arranged in a diode-laser bar. An optical system focuses fast axis diverging rays from diode-lasers in the array into a fast-axis focal plane of the optical system. The optical system forms slow axis rays from the diode-lasers into bundles of parallel rays that intersect in the fast axis focal plane. The focused fast-axis rays and the intersecting bundles of parallel rays form the line of light in the fast axis focal plane. The optical system includes two arrays of cylindrical microlens surfaces. The microlens surfaces contribute to providing a uniform intensity of light along the line of light.

19 Claims, 8 Drawing Sheets

APPARATUS FOR PROJECTING A LINE OF LIGHT FROM A DIODE-LASER ARRAY

TECHNICAL FIELD OF THE INVENTION

The present invention relates in general to diode-laser light-sources and in particular relates in general to a light source for projecting light from a linear diode-laser array into an elongated line of light.

DISCUSSION OF BACKGROUND ART

Diode-lasers are commonly used as sources of illumination in various graphics applications such as display systems, optical printing systems and optical recording systems. In one type of prior-art imaging system, a linear (one-dimensional) array of light modulators is illuminated by an illuminator including a light source. Illumination from the array of modulators is projected onto a recording medium or the like in the form of a line of images of the modulators. By scanning the recording medium past the line of images and appropriately synchronizing the scanning with operation of the modulator array, the modulator array is used to draw a two-dimensional image on the recording medium.

A preferred light-source for the illuminator is a linear array of diode-lasers commonly referred to as a diode-laser bar. A diode-laser bar can efficiently provide relatively high illumination power, for example 60.0 Watts (W) or more, from a source having a maximum overall dimension no greater than about 10 centimeters (cm). A disadvantage, however, is that each of the diode-lasers in the bar is an individual emitter. This presents problems in selecting an appropriate optical configuration for the illuminator.

This problem is addressed in one prior-art illuminator by including a diode-laser array (or correspondingly an array of light-emitting diodes) having a number of emitters equal to the amount of modulators to be illuminated, and an optical system configured to image each emitter onto a corresponding modulator. This type of illuminator has a disadvantage that it is dependent on all emitters continuing to function. Failure of one emitter could cause a reduction in performance of the recording system, for example, a black line on an image in the direction of scanning.

An illuminator apparatus for overcoming this disadvantage is disclosed in U.S. Pat. No. 5,517,359 (Gelbart et al.). Here an optical system is used to project elongated overlapping images of each individual emitter onto a modulator array. The number of emitters need not correspond to the number of modulators, and failure of an individual emitter is described as merely reducing the overall illumination on the modulator rather than effecting the spatial distribution of illumination on the modulator.

Another illuminator apparatus for overcoming this disadvantage is described in a co-pending application Ser. No. 09/522,120, assigned to the assignee of the present invention by inventors Rekow et al. The Rekow et al. arrangement comprises a diode-laser bar including a linear array of diode-lasers (emitters). An optical system is arranged with a longitudinal axis thereof parallel to the propagation direction of light from the diode-lasers. The optical system has mutually perpendicular axes designated fast and slow axes fast and corresponding to fast and slow axes of the diode-lasers. The optical system is arranged to focus fast-axis diverging rays of the diode-lasers in a focal plane perpendicular to the longitudinal optical axis, and arranged to form the slow-axis diverging rays of the diode-lasers into a plurality of bundles of parallel rays, one thereof for each diode-laser. The bundles of parallel rays intersect in a focal plane of the optical system. The optical system thereby causes light from the diode-lasers to be formed into a line of light in the focal plane. The line of light has a width in the fast axis of the optical system and a length in the slow axis of the diode-lasers.

The line of light has a distribution of intensity of illumination similar in form to that of the far-field intensity distribution of an individual emitter. This intensity distribution is not optimally uniform, but has a somewhat Gaussian distribution of intensity modified by a central reduction of intensity. In other embodiments of the Rekow et al. apparatus, the distribution of intensity along the line of light is rendered somewhat more uniform by including one or more physical stops arranged to prevent selected portions the fast and slow-axis diverging rays from the diode-laser array from reaching the fast-axis focal plane of the optical system. The selected portions are chosen to optimize the intensity of light distribution along the length of the line of light.

While somewhat effective in improving the intensity distribution along the line of light, the distribution is not believed to be optimum and comes at the expense of wasting light from the diode-laser array that is prevented by the physical stops from reaching the focal plane of the optical system. There is a need to for a diode-laser bar powered illuminator that projects a line of light wherein the intensity of illumination in the line is substantially uniform but that does not require the inclusion of physical stops to achieve this uniformity of illumination.

SUMMARY OF THE INVENTION

The present invention is directed to an illumination apparatus for projecting a line of light. In one aspect, the inventive apparatus comprises a plurality of diode-lasers each thereof having an emitting-aperture and arranged in an elongated linear array. The diode-lasers being spaced apart by a spacing defined as the distance between the centers of adjacent diode-lasers in the array. The diode-laser array has a slow axis parallel to the length direction of the array, and a fast axis perpendicular to the slow axis. Light is emitted from an emitting aperture each of the diode-lasers as diverging rays in both the fast and slow axes in a general direction of propagation mutually perpendicular to both the fast and slow axes. The inventive optical apparatus includes an optical system including a first anamorphic lens, and a lens group including a second anamorphic lens and a spherical lens having positive optical power. The optical system has a longitudinal axis parallel to the propagation direction of light from the diode-lasers and has mutually perpendicular fast and slow axes corresponding to the fast and slow axes of the diode-laser array. The optical system further includes one or more arrays of microlenses providing two arrays of cylindrical refracting surfaces. The one or more arrays of microlenses are located between the first anamorphic lens and the lens group. The arrays of cylindrical refracting surfaces have a pitch defined as the distance between vertices of adjacent ones of the cylindrical surfaces. The pitch of the microlens array is different from the spacing between the diode-lasers. The cylindrical refracting surfaces are arranged such that each thereof receives rays from a plurality of the diode-lasers and such that rays leaving the one or more microlens arrays arrive at the lens group as rays diverging in both the fast and slow axes. The lens group is arranged to focus the fast-axis diverging rays of the diode-laser array in a focal plane perpendicular to the longitudinal optical axis, and is arranged to form the slow axis diverging rays into a plurality of converging bundles of parallel rays intersecting in the focal plane. Accordingly, light from the diode-lasers is formed into a line of light about in the focal plane. The line of light has a width in the fast axis and a length in the slow axis.

Preferably, each of the first and second anamorphic lenses of the optical system has greater optical power in the fast axis than in the slow axis, and most preferably has positive optical power in the fast axis and zero optical power in the slow axis. Preferably, each of the microlenses in the one or more microlens arrays has zero optical power in the fast axis and positive optical power in the slow axis.

In one preferred embodiment of the inventive illumination system, there is only one microlens array and each of the microlenses in the microlens array has first and second cylindrical surfaces. In another preferred embodiment of the inventive illumination system there are two microlens arrays and each of the microlenses in the microlens array has a plane first surface and cylindrical second surface.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1A:
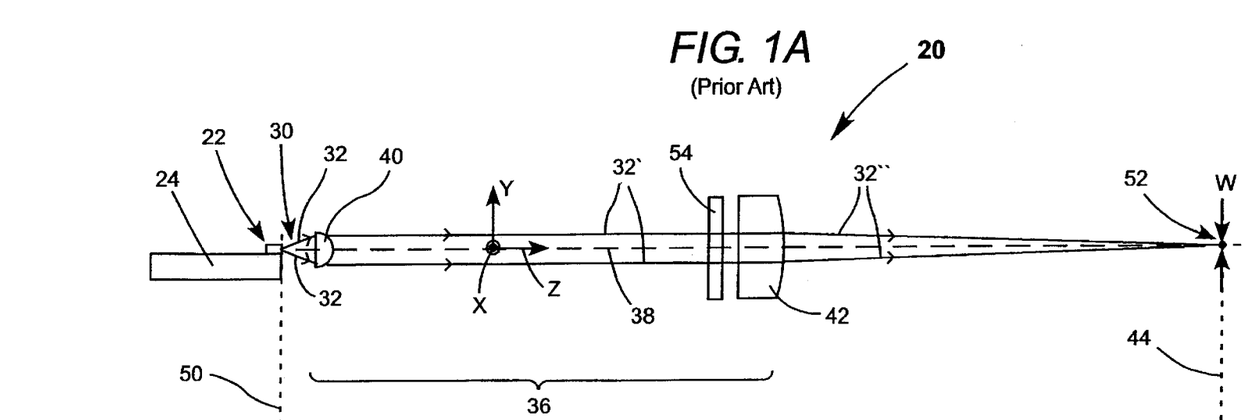
FIGS. 1A and 1B schematically illustrate a prior-art, diode-laser, line-of-light projector including a linear array of diode-lasers incorporated in a diode-laser bar and an optical system that focuses fast-axis diverging rays from the diode-lasers in a focal plane of the optical system and forms slow-axis diverging rays from the diode-lasers into parallel ray bundles that intersect in the focal plane, the focused fast-axis rays and intersecting parallel ray bundles forming the line of light.
Figure 1B:
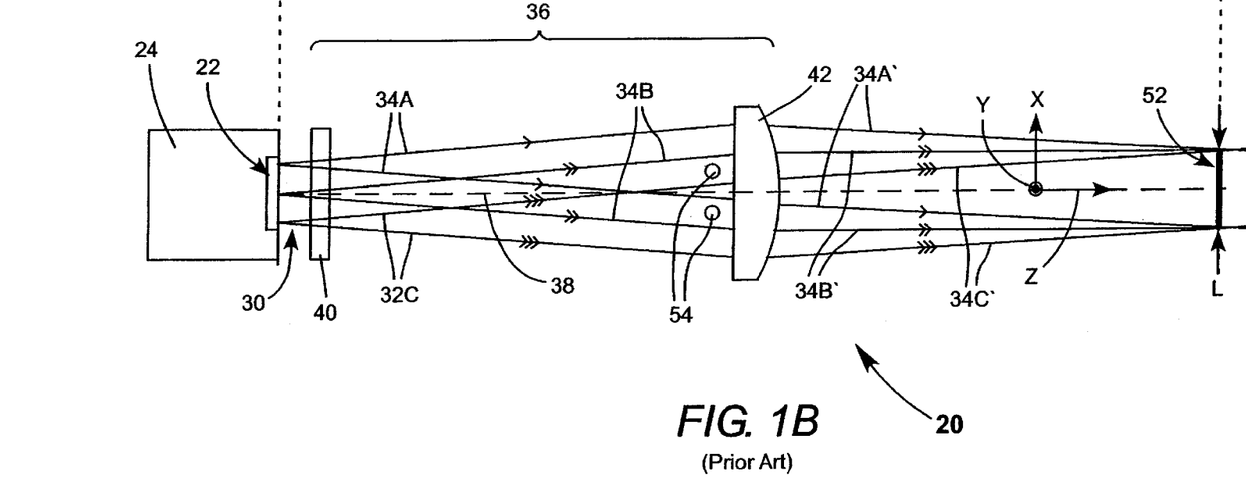
Figure 2:
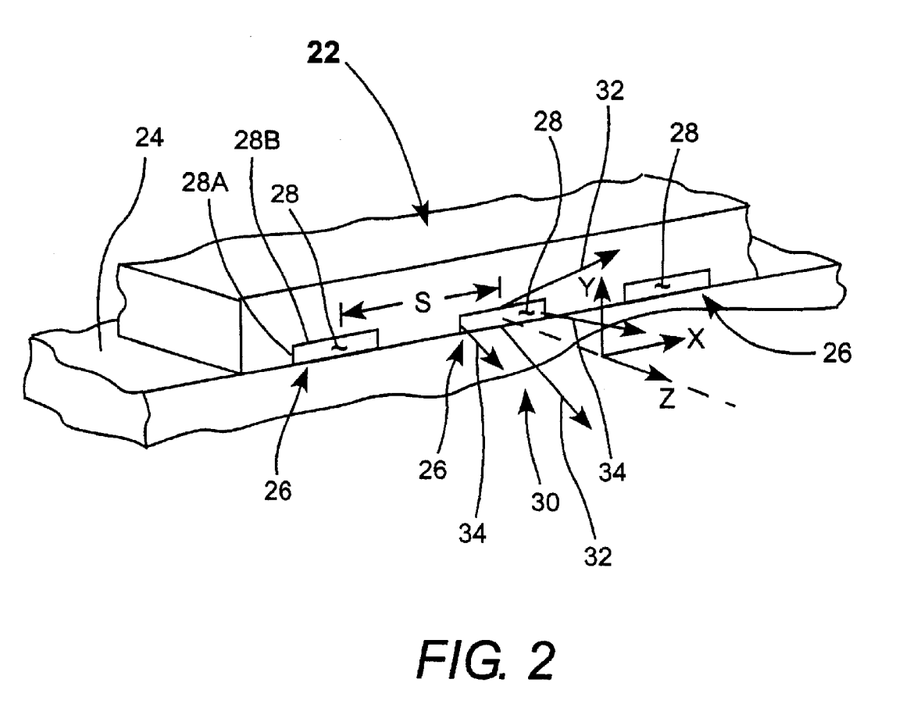
FIG. 2 is a fragmentary isometric view schematically illustrating details of fast and slow axis rays of diode-lasers in the diode-laser bar of FIG. 1.

Before proceeding with a detailed description of the present invention it is useful to briefly review a prior-art diode-laser line projector in accordance with teachings of Rekow et al. in above-mentioned application Ser. No. 09/522,120. Turning to the drawings, wherein like features are designated by like reference numerals, FIGS. 1A and 1B schematically depict one such prior-art line-projector 20. Line projector 20 includes, as a light-source, a diode-laser bar 22, details of which are illustrated in FIG. 2. Diode-laser bar 22 is in thermal contact with a heat-sink or sub-mount 24. Diode-laser bar 22 includes a plurality of diode-lasers 26 each thereof having an emitting aperture 28. In a multimode diode-laser bar, these emitting apertures have a height 28A of about 1.0 micrometers ($\mu$m) and a width 28B up to about 200.0 $\mu$m. Diode-lasers 26 can be defined as having a pitch or spacing S that is the distance between the centers, or any other corresponding points, of adjacent emitting apertures 28 thereof.

The diode-laser bar (and diode-lasers therein) can also be characterized as having a slow axis X parallel to the width direction of emitting apertures 28, and a fast axis Y perpendicular to slow axis X. Light is emitted from an emitting aperture 28 in a general direction (axis) of propagation Z mutually perpendicular to the fast and slow axes. The light is emitted in the form of a diverging beam 30. Rays 32 of beam 30 in fast axis Y diverge at an included angle of about 32°. Rays 34 of beam 30 in the slow axis X diverge at an included angle of about 7.5°.

Line-projector 20 includes an optical system 36 having a longitudinal (Z) axis 38 a fast (Y) axis corresponding to the fast axis of diode-laser bar 22, and a slow (X) axis corresponding to the slow axis of diode-laser bar 22. Optical system 36 includes a cylindrical lens 40, and a spherical lens 42. Cylindrical lens 40 has positive refractive power in the fast (Y) axis and zero optical power in the slow (X) axis. Optical system 36 is arranged to focus fast-axis diverging rays 32 in a focal plane 44 perpendicular to longitudinal optical axis 38 of optical system 36. Fast-axis diverging rays 32 are first collimated in the fast axis by cylindrical lens 40 as indicated by rays 32'. Collimated rays 32" are then focused into focal plane 44 by spherical lens 42. Rays 32, 32' and 32" can be assumed to be representative of fast axis rays from any diode-laser in diode-laser bar 22.

Optical system 36 is arranged to form the slow-axis diverging rays from individual diode-lasers into a plurality of bundles of parallel rays, one thereof for each diode-laser 26 in diode-laser bar 22. The manner in which this is accomplished is depicted schematically FIG. 1B. Here, three slow-axis diverging ray bundles bounded by rays 34A, 34B, and 34C are depicted as being emitted from three diode-lasers 26 (not shown in FIG. 1B). Ray bundle (34B) is emitted at about the center, and the other two near opposite ends of diode-laser bar 22. As discussed above, diode-laser bar 22 may include as many as 50 diode-lasers or more.

As cylindrical lens 40 does not have optical power in the slow axis, the slow-axis divergence of the diverging ray bundles is not changed as the ray bundles traverse lens 40. Spherical lens 42 is located at a distance about equal to the focal length thereof from a plane 50 in which emitting apertures 28 of diode-laser bar 22 are located. Accordingly, spherical lens 42 forms the diverging ray bundles 34A, 34B and 34C into corresponding parallel ray bundles 34A', 34B' and 34C'. The parallel ray bundles intersect in focal plane 44 where corresponding fast axis rays 32" are focused. Optical system 36 thereby causes light from the diode-lasers to be formed into a line of light in focal plane 44. The line of light has a width W in the fast axis and a length L in the slow axis.

As discussed above, absent any measure to the contrary, light intensity along line of light 52 is not optimally uniform as would be required in most applications of line-projector 20, but has a truncated Gaussian distribution having one or more central depressions or modulations depending on the width and other parameters of emitting apertures 28. As each bundle of parallel rays originates from a particular diode-laser, the intensity distribution approximates an exaggerated far-field intensity distribution of any one diode-laser. This can result in variations in light intensity of up to ±20% of a nominal mean along the line of light.

In order to improve distribution of intensity along the line of light, two cylindrical physical stops 54 are located adjacent spherical lens 42 on opposite sides of longitudinal axis 38. Stops 54 prevent selected portions the fast and slow-axis diverging rays from the diode-laser array from reaching the fast-axis focal plane of the optical system. This, in turn, provides significant improvement in the intensity of illumination along line of light 52. This improvement, however, is achieved at the expense of a loss of power due to a portion of the light from the diode-laser bar being intercepted by the stops. Further, changes in the characteristics of the emitters with time can change the intensity distribution of the emitters to an extent that the placement of the physical stops may no longer be optimal, thereby degrading intensity distribution in the projected line of light.

Figure 3A:
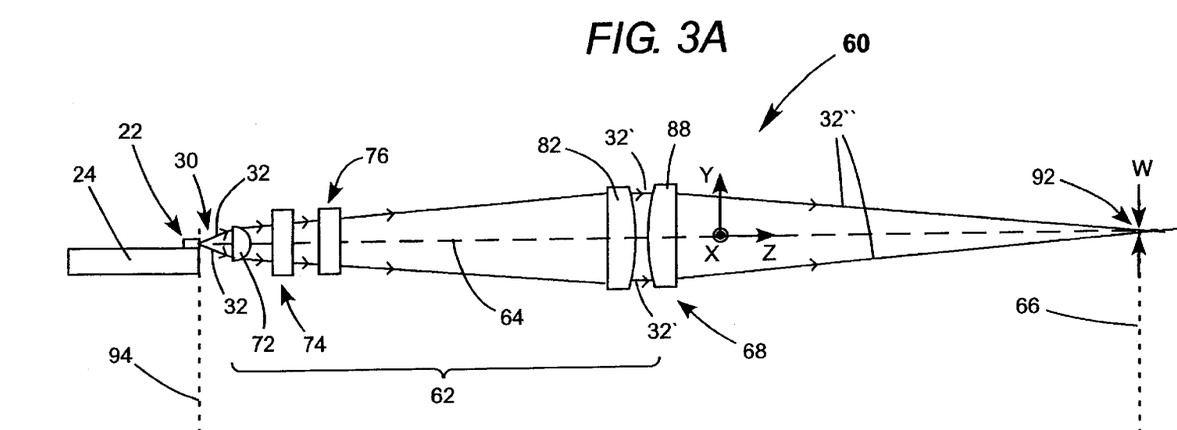
FIGS. 3A and 3B schematically illustrate one preferred embodiment of a line-of-light projecting illumination system in accordance with the present invention including a linear array of diode-lasers incorporated in a diode-laser bar and an optical system, including two cylindrical lenses, one spherical lens and two microlens arrays, arranged to focus fast-axis diverging rays from the diode-lasers in a focal plane of the optical system and to form slow-axis diverging rays from the diode-lasers into parallel ray bundles that intersect in the focal plane, the focused fast-axis rays and intersecting parallel ray bundles forming the line of light.
Figure 3B:
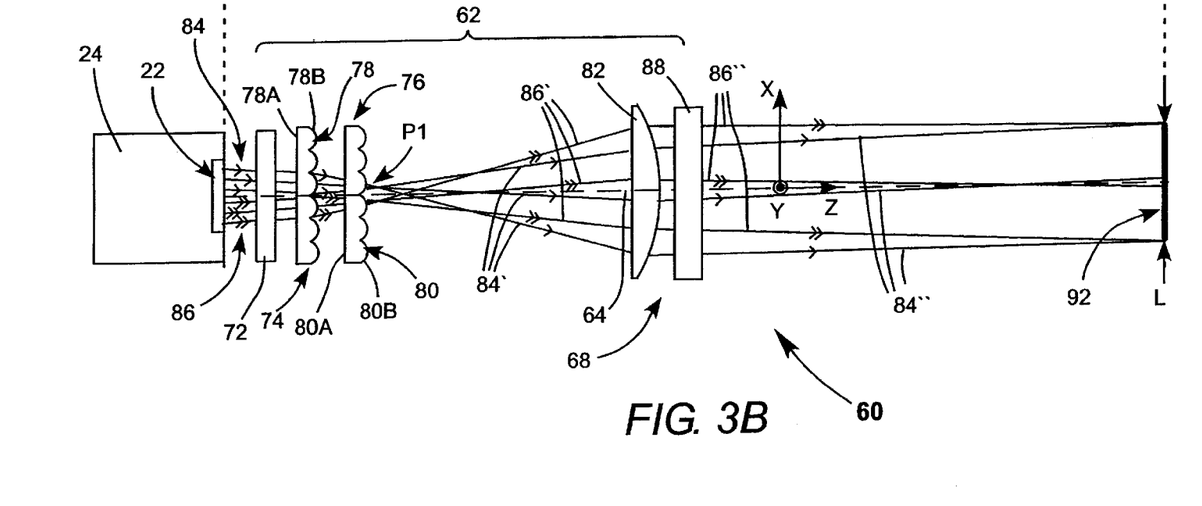
Figure 4:
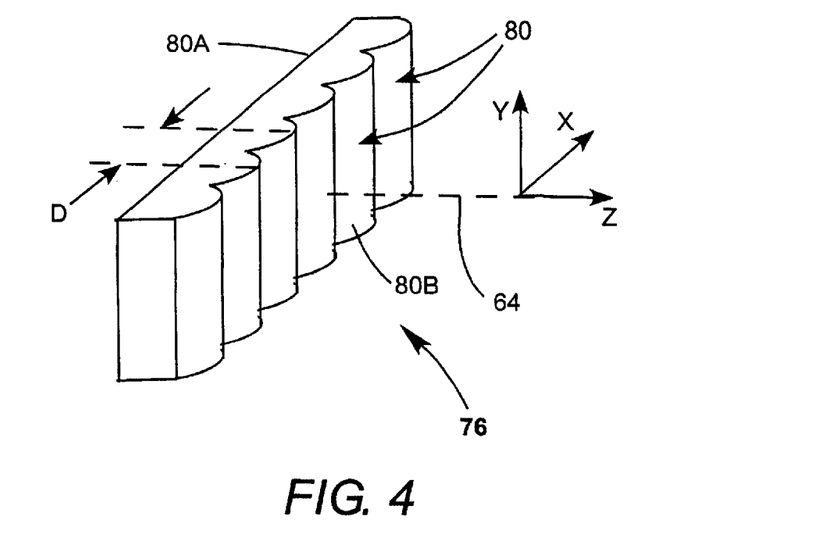
FIG. 4 is an isometric view schematically illustrating details of a microlens array of FIGS. 3A and 3B.

Referring now to FIG. 3A, FIG. 3B, and FIG. 4, a preferred embodiment 60 of a diode-laser line-of-light projector in accordance with the present invention includes a linear diode-laser array or diode-laser bar 22 similar to the diode-laser array of line-projector 20 of FIGS. 1A and 1B. Projector 60 includes an optical system 62 having a longitudinal (Z) axis 64 and a fast-axis focal plane 66. FIGS. 3A and 3B schematically depict respectively the passage of fast-axis and slow-axis diverging rays from diode-lasers 26 (not shown) through optical system 62.

Optical system 62 includes a first cylindrical lens 72 having positive dioptric (optical) power in the fast-axis and zero optical power in the slow axis. Cylindrical lens 72 is arranged with respect to diode-laser bar 22 for reducing the divergence of fast-axis diverging rays 32. Following cylindrical lens 72 in the direction of light propagation (the Z-axis) are first and second cylindrical microlens arrays 74 and 76, respectively, including cylindrical microlenses 78 and 80, respectively. Each of cylindrical microlenses 78 and 80 have planar first surfaces 78A and 80A, respectively, and cylindrical second surfaces 78B and 80B, respectively. The cylindrical microlenses in each array are arranged contiguously, side by side in a direction parallel to the slow (X) axis with the cylindrical axis of the microlenses (not explicitly shown) parallel to the fast (Y) axis. The pitch of the cylindrical microlenses, i.e., the spacing D of the vertices of the cylindrical surfaces (see FIG. 4) is different from the spacing S of diode-lasers 26 in diode-laser bar 22 (see FIG. 2). Preferably, the pitch D of the microlenses is greater than the pitch S of the diode-lasers. The pitch of the microlenses in each array is preferably the same. The pitch may be different if some predetermined non-uniform light distribution is desired. Following microlens arrays 74 and 76 in optical system 62 is a lens group 68 including a spherical lens 82 and a cylindrical lens 88. Cylindrical lens 88 has positive optical power in the fast axis and zero optical power in the slow axis.

Spherical lens 82 collimates the reduced-divergence, fast-axis diverging rays 32 from the diode-lasers in diode-laser bar 22. The collimated fast-axis rays are designated in FIG. 3A as rays 32' exiting lens 82. Spherical lens 82 causes parallel ones of the slow-axis diverging rays from the diode-lasers to converge towards each other. This is schematically illustrated in FIG. 3B by tracing sets 84 and 86 of three parallel oblique rays through optical system 62. Each ray in a set being a slow-axis diverging ray (corresponding to one of rays 34 in FIG. 2) originating from a different diode-laser in diode-laser bar 22. Rays in set 84 are identified by single arrows. Rays in set 86 are identified by double arrows.

This action of microlens arrays 74 and 76 is to transform the array of spaced-apart emitting apertures 28 in diode-laser bar 22 into a virtual, single emitting aperture (not explicitly shown) at or near microlens array 76. Because the pitch of the microlenses in microlens arrays 74 and 76 is different from the pitch of diode-lasers in the diode-laser bar, each microlens in the microlens arrays receives slow-axis rays from a plurality of diode-lasers in diode-laser bar 22. Further, each microlens receives rays from a different plurality of these slow-axis rays. A result of this rays emanating from one position in an emitting aperture 28 of a diode-laser 26 will arrive in a different relative position in the virtual aperture. Accordingly, the intensity distribution of light emerging from microlens 76 will not be the heavily-modulated, truncated Gaussian distribution of an emitting aperture 28 of a diode-laser, but will be randomized to a degree dependent, inter alia, on the difference in pitch between the diode-lasers and the microlenses and the spacing of the microlenses with respect to each other, diode-laser bar 22 and cylindrical lens 72.

Continuing with reference to FIG. 3B, after converging adjacent cylindrical surfaces 80B of microlens array 76, the sets of originally-parallel slow-axis rays diverge, passing through spherical lens 82 of lens group 68. The divergence (numerical aperture or NA) of these rays on leaving microlens array 76 is about the same as the divergence (NA) of slow axis rays from an emitting aperture 28 (see slow axis rays 34 in FIG. 2). Diverging-rays corresponding to originally parallel sets of rays 84 and 86 are indicated in FIG. 3B by reference numerals 84' and 86' respectively.

Spherical lens 82 is arranged to form the diverging slow-axis rays 84' and 86' into converging parallel bundles of rays designated in FIG. 3B by reference numerals 84" and 86". As cylindrical lens 88 has zero power in the slow axis, rays 84' and ray bundles 84" and 86" are unaffected by lens 88. These converging parallel bundles of rays intersect in focal plane 66. Cylindrical lens 88 focuses collimated fast axis rays 32' in focal plane 66. The focused rays are designated in FIG. 3A by reference numerals 32". The combination in focal plane 66 of focused fast axis rays 32" and intersecting parallel ray bundles 84" and 86" forms a line of light 92 in focal plane 66. Line of light 92 has a length L in the slow axis and a width W in the fast axis.

Before continuing with a description of further embodiments of the inventive diode-laser line-of-light projector, some preferred guidelines for the configuration and spacing of optical components of optical system 62 of projector 60 are next set forth. In these guidelines, emitting apertures 28 in diode-laser bar 22 are designated as lying in a plane 94. The fast-axis focal length of cylindrical lens 72 is designated $f_1$. The slow-axis focal length of each microlens 78 of array 74 and each microlens 80 of array 76 are designated $f_2$ and $f_3$, respectively. The number and pitch of microlenses in each array is preferably the same as discussed above. This provides that all light passing through a microlens in microlens array 74 passes through a corresponding microlens in microlens array 76. Focal lengths $f_2$ and $f_3$ are the preferably the same for best optical throughput. The focal length of spherical lens 82 is designated $f_4$. The fast axis focal length (in both fast and slow axes) of cylindrical lens 88 is designated $f_5$.

Regarding preferred axial spacing of optical components in optical system 60, cylindrical lens 72 is spaced by about $f_1$ from emitting-aperture plane 94. Surfaces 78B of microlenses 78 are spaced by about $f_2$ from emitting-aperture plane 94. Surfaces 80B of microlenses 80 are spaced by about $f_3$ from surfaces 78B of microlenses 78. Spherical lens 82 and cylindrical lens 88 are spaced by about $f_4$ and $f_5$, respectively, from surfaces 80B of microlenses 80. Line 92 is spaced from lens 90 by about $f_5$.

Regarding functions of the optical elements, under the above-recited guidelines, each microlens surface 80B forms an image of a corresponding microlens surface 78B at infinity. Spherical lens 82 reforms that image of each microlens in focal plane 66. The reformed image is symmetrical about longitudinal axis 64 of optical system 62. As a result, the intensity distribution of illumination along line 92 is an average of the intensity distribution across each surface 80B of microlenses 80, which, as noted above, is randomized. As a result of this, intensity of illumination along the projected line of light is uniformly distributed.

Figure 5A:
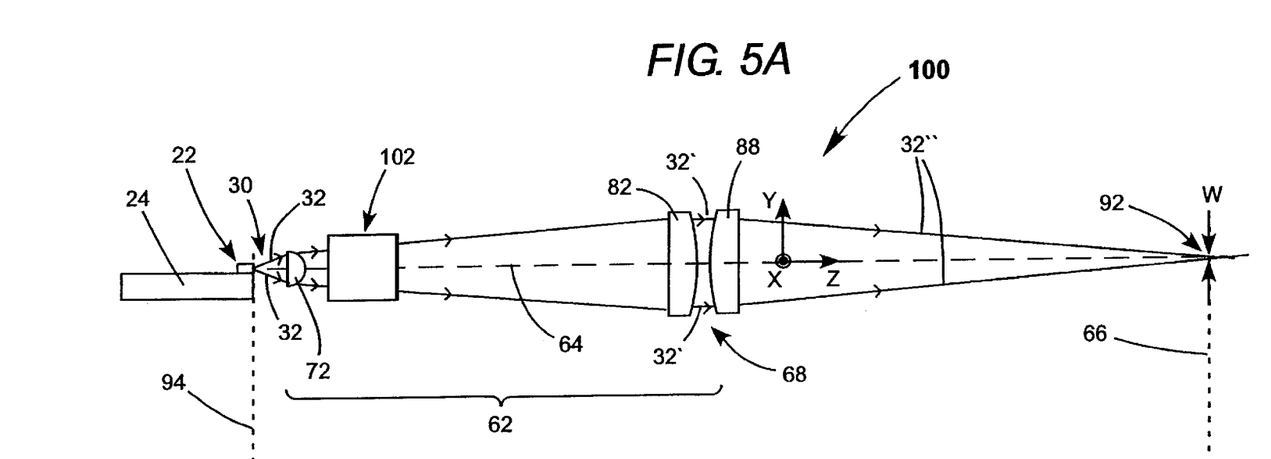
FIGS. 5A and 5B schematically illustrate another preferred embodiment of a line-of-light projecting illumination system in accordance with the present invention, similar to the illumination system of FIGS. 3A and 3B but wherein the two microlens arrays are replaced by a single thick microlens array having a similar optical function.
Figure 5B:
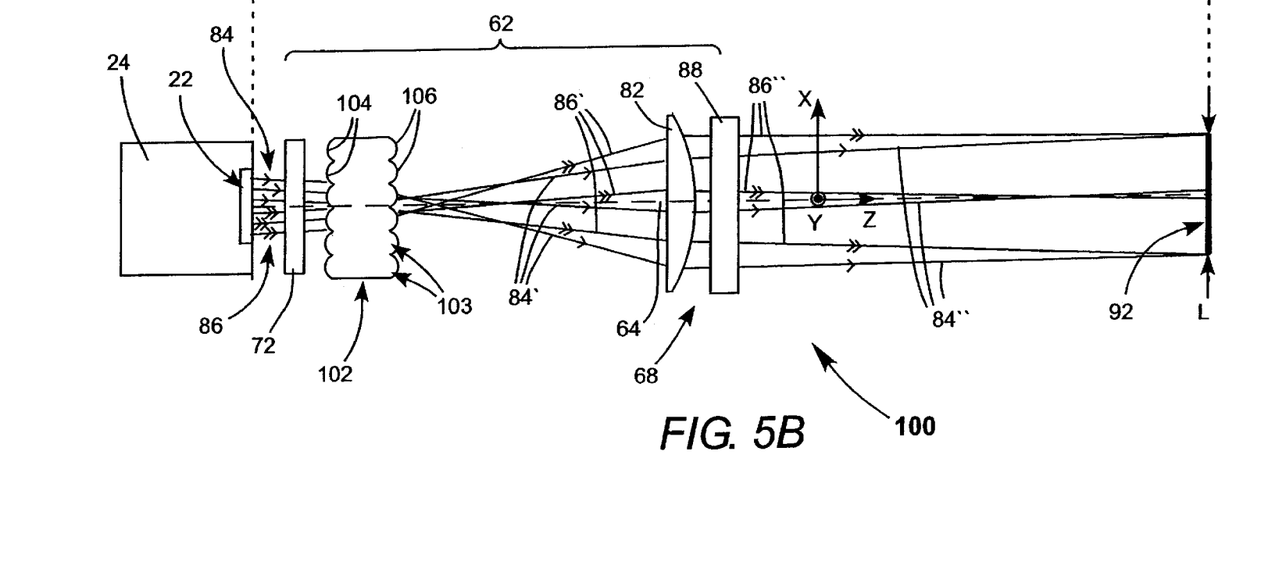
Figure 6:
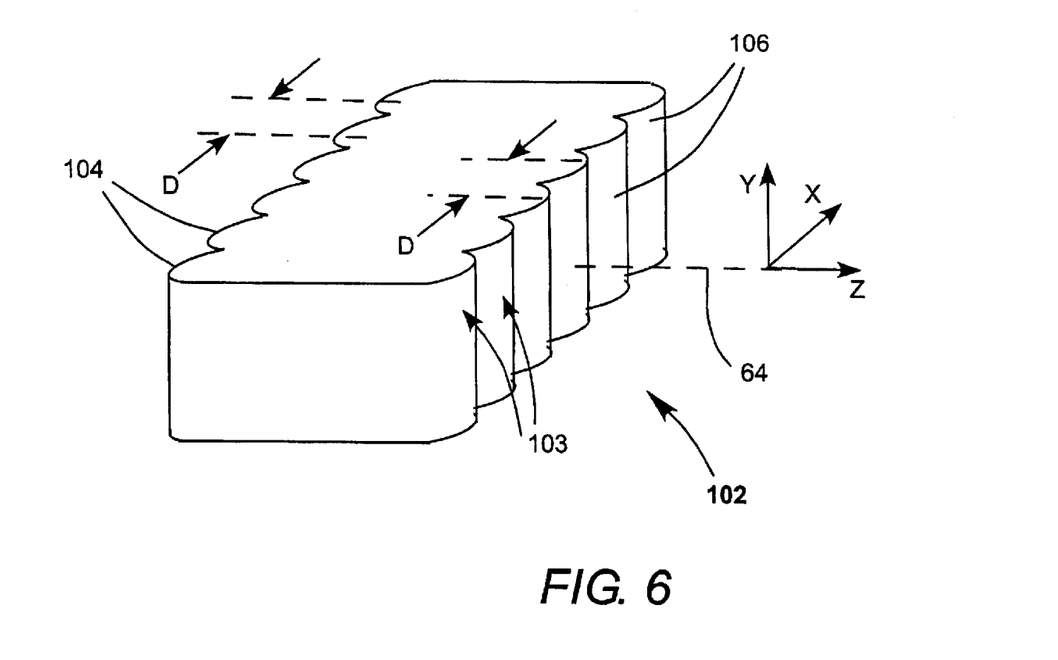
FIG. 6 is an isometric view schematically illustrating details of the microlens array of FIGS. 5A and 5B.

In FIG. 5A, FIG. 5B, and FIG. 6, another embodiment 100 of a diode-laser line-of-light projector in accordance with the present invention is schematically depicted. Projector 100 is similar to above-described projector 60 in form, and functional and spatial relationship of components, with the exception that, in optical subsystem 68 of projector 100, a single microlens array 102 including a plurality of microlenses 93 is substituted for microlens arrays 74 and 76 of projector 60. Each microlens 103 in microlens array 102 includes first and second cylindrical surfaces 104 and 106 respectively. The number of surfaces 104 is equal to the number of surfaces 106. Preferably, surfaces 104 and 106 have equal curvature. Preferably also, surfaces 104 and 106 are optically arranged in the same way as surfaces 78B and 80B in microlenses of projector 60, i.e., each surface 106 is optically spaced from a corresponding surface 104 by a focal length of the surface 106 such that each surface 106 forms an image of a corresponding surface 104 at infinity.

One advantage of substituting a single thick microlens array 102 for two relatively-thinner microlens lens arrays, such as arrays 74 and 76, is that installation and alignment of the single microlens array is simpler. Another advantage is that the single microlens array 102 will take up less axial space than two microlenses arrays 74 and 76 with similarly-curved cylindrical surfaces, similarly optically related.

Figure 7:
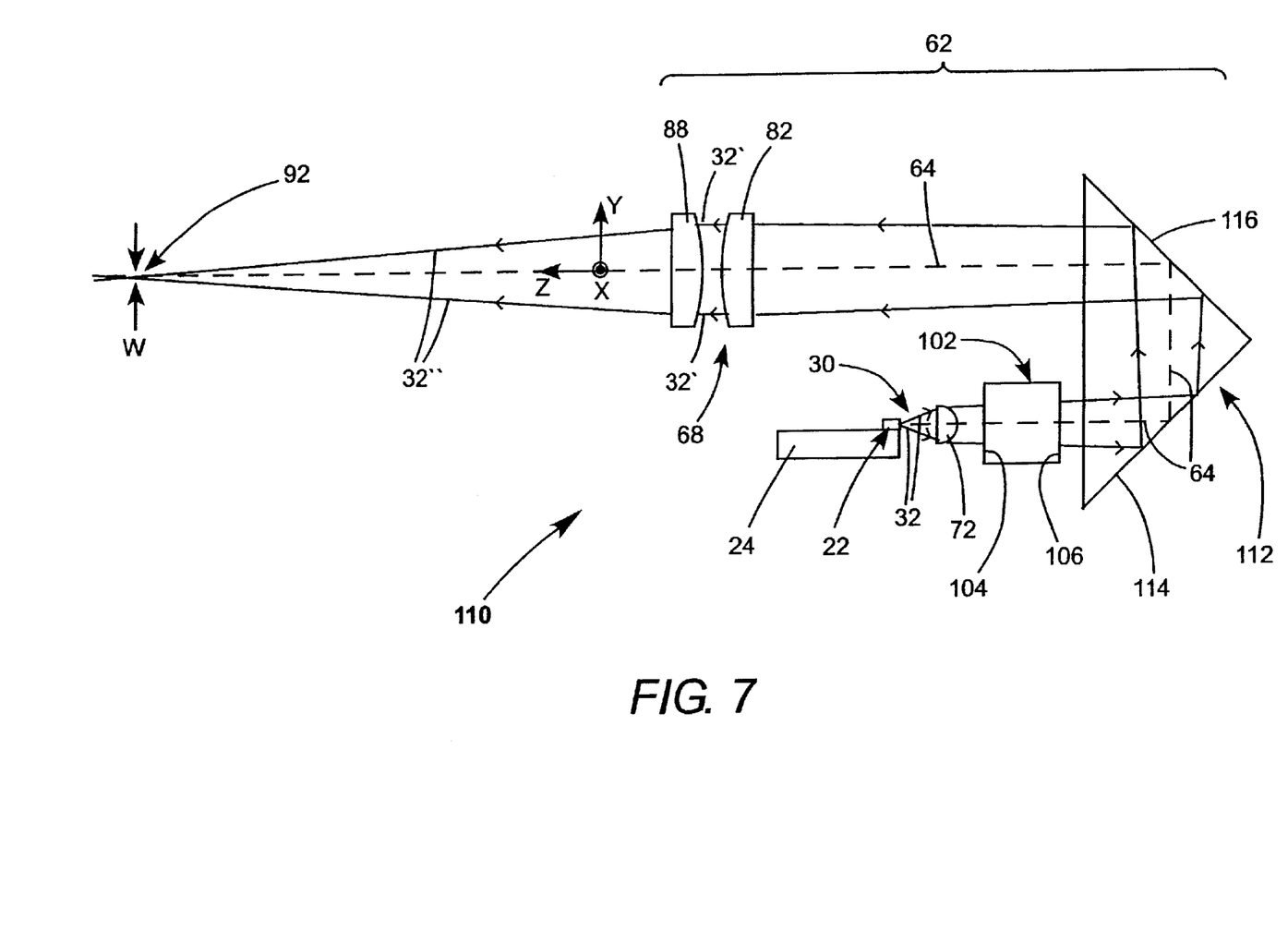
FIG. 7 schematically illustrates yet another preferred embodiment of a line-of-light projecting illumination system in accordance with the present invention, similar to the system of FIGS. 5A and 5B but wherein a longitudinal axis of the optical system is folded twice by a prism to reduce the physical length of the optical system compared with the optical length of the longitudinal axis.

FIG. 7 schematically depicts yet another embodiment 110 of a diode-laser line-of-light projector in accordance with the present invention. Projector 110 is similar to above-described projector 100, with the exception that longitudinal (Z) axis 64 of the projector is folded 180 degrees by a prism 112. Projector 110 is shown only in the fast axis. The slow-axis arrangement will be evident to one skilled in the art from the description of equivalent projector 100 given above. The 180-degree fold of axis 64 in projector 110 is accomplished via two successive 90-degree folds at reflecting surfaces 114 and 116 of prism 112. Folding axis 64 in this manner allows optical system 62 to be accommodated in apparatus shorter than the optical length of axis 64. This provides for a relatively more compact projector.

Figure 8:
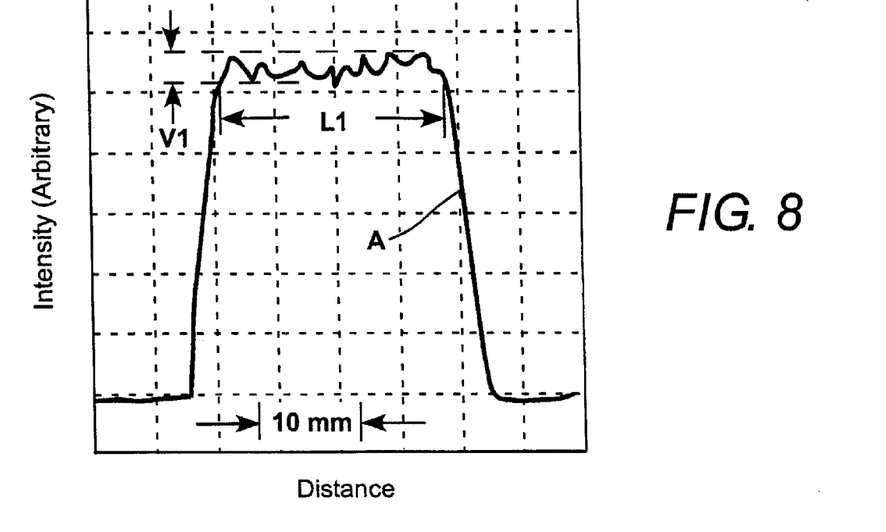
FIG. 8 is a graph schematically illustrating measured light-intensity distribution along the line-of-light in a line-of-light projecting illumination system including a single microlens array in accordance with principles of the system of FIG. 7.

In FIG. 8, curve A schematically depicts measured intensity distribution along a line of light 92 in one example of the inventive line-of-light projector 110 of FIG. 7. Here, line 92 has a useful length L1 of about 20 mm. There is an overall variation V1 of intensity within length L1 of about 19 percent of the nominal value.

In this example of projector 110, diode-laser bar 22 has a length of 6.0 mm and includes 31 diode-lasers with a spacing or pitch of about 200 μm. Microlens array 102 includes 40 microlenses with a spacing or pitch of about 250 μm. The radius of curvature of surfaces 104 and 106 of the microlenses is about 800 μm and the physical spacing between the microlens surfaces is about 2.25 mm. Cylindrical lens 72 has a fast axis focal length of about 170 μm and is spaced at about 30 μm from emitting-aperture plane 94. Surfaces 104 of microlens array 102 are axially spaced at about 1.6 mm from emitting-aperture plane 94. Spherical lens 82 is a two element achromat lens having a focal length of about 140 mm and is spaced at about 140 mm from surface 106 of microlens array 102. Cylindrical lens 88 has a fast-axis focal length of about 150 mm and spaced at about 2 mm from spherical lens 82. The spacings of lenses 82 and 88 specified here are the spacings as measured along folded longitudinal axis 64. Line 92 is projected at a distance of about 130 mm from lens 88.

Figure 9:
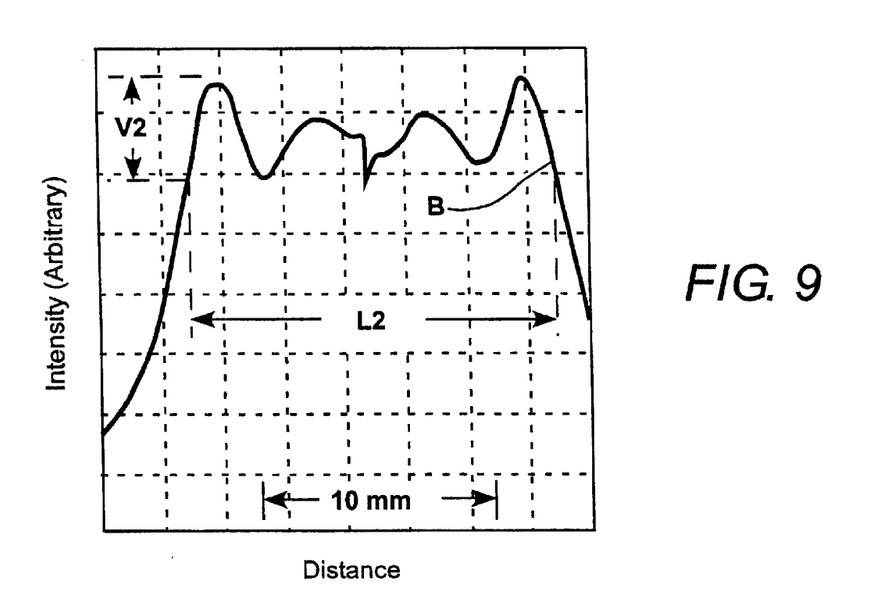
FIG. 9 is a graph schematically illustrating measured light-intensity distribution along the line-of-light in the line-of-light projecting illumination system of FIG. 8 without the microlens.

It is interesting to note that were microlens array 102 removed from projector 110 of FIG. 7 (or from corresponding projector 100 of FIG. 7) the projector would become functionally equivalent to the Rekow et al. projector 20 of FIGS. 1A and 1B, but without the physical stops 54 for improving intensity distribution along the projected line of light. By way of experiment, microlens array 102 was removed from the above-discussed example of projector 110 and intensity distribution along projected line 92 again measured. The results of the experiment are graphically illustrated in FIG. 9. Here, curve B schematically illustrates measured intensity distribution along a line of light 92 in the exemplified projector without microlens array 102. Line 92 has a useful length L2 of about 16 mm, but within the useful length of the line there is an overall variation of intensity V2 of about 25%. This experiment provides a useful demonstration of the effectiveness of a microlens array (or arrays) having the above-discussed relationship to the diode-laser array in providing uniform illumination in a line-of-light projected by the inventive projector.

Figure 10A:
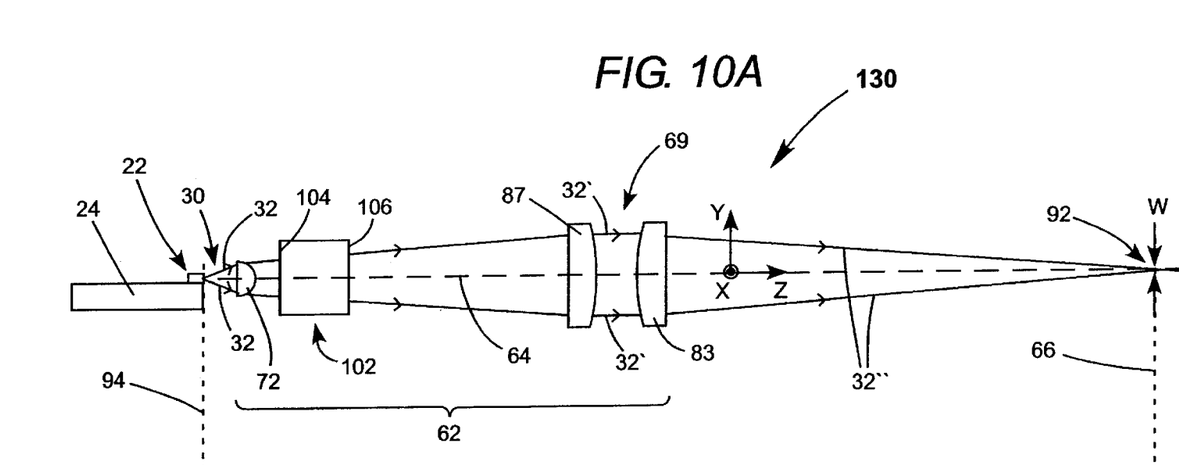
FIGS. 10A and 10B schematically illustrate still another preferred embodiment of a line-of-light projecting illumination system in accordance with the present invention, similar to the illumination system of FIGS. 5A and 5B but having a different arrangement of lenses in the optical system.
Figure 10B:
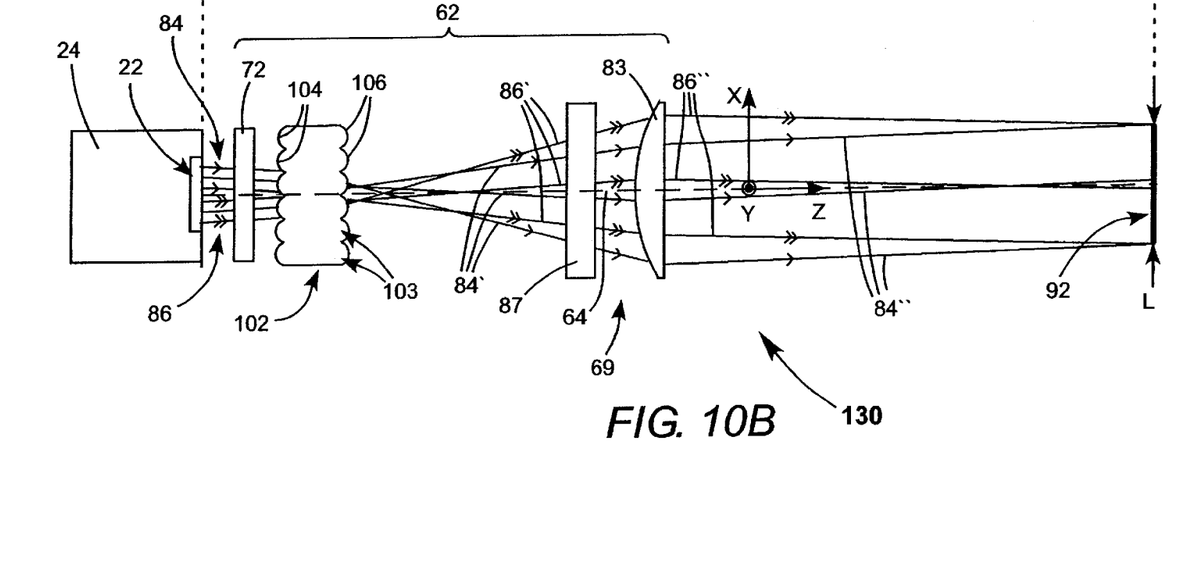

Referring now to FIGS. 10A and 10B still another embodiment 130 of an illumination system in accordance with the present invention is schematically illustrated. System 130 is similar to system 100 of FIGS. 5A and 5B with the exception that the order of lenses in the lens group of the optical system is reversed. In lens group 68 of system 60, spherical lens 82 precedes cylindrical lens 88 in the direction of propagation of light through the optical system. In system 130 a corresponding lens group 69 includes a cylindrical lens 87 preceding a spherical lens 83. Optical groups 68 and 69 have the same optical function inasmuch as each group focuses diverging rays microlens array 102 in focal plane 66 and forms slow axis diverging rays the microlens array into a plurality of converging bundles of parallel rays intersecting in the focal plane. Those skilled in the art will recognize without further illustration that a lens group such as group 69 of system 130 may also be substituted for lens group 68 in system 60 of FIGS. 3A and 3B and in system 110 of FIG. 7.

It should be noted here that all above-described embodiments of the inventive projector include lenses and surfaces defined as cylindrical lenses and cylindrical surfaces. This definition, here, refers to lenses and surfaces that have finite optical power in one of the fast and slow axes of the projector and zero optical power in the other. These lenses and surfaces can be regarded as particular examples of a more general category of lenses and surfaces, often referred to as anamorphic lenses and surfaces, in which optical power in orthogonally related axes is different, but without power in any one axis necessarily being zero. Those skilled in the art may devise examples of the inventive projector that include anamorphic lenses or optical subsystems having different, non-zero optical power in the fast and slow axes without departing from the spirit and scope of the present invention.

In summary, the present invention is described above in terms of a preferred and other embodiments. The invention, however, is not limited to the embodiments described and depicted. Rather, the invention is limited only by the claims appended hereto.

What is claimed is:

1. An illumination apparatus for projecting a line of light, comprising;
   a plurality of diode-lasers each thereof having an emitting-aperture and arranged in an elongated linear array thereof, said diode-lasers being spaced apart by a spacing defined as the distance between the centers of adjacent ones thereof;
   said linear diode-laser array having a slow axis parallel to the length direction thereof, and a fast axis perpendicular to said slow axis, light being emitted from each of said diode-lasers, from an emitting aperture thereof, as diverging rays in both said fast and slow axes, in a general direction of propagation mutually perpendicular to both said fast and slow axes;
   an optical system, said optical system including a first anamorphic lens, and a lens group including a second anamorphic lens and a spherical lens having positive optical power, said optical system having a longitudinal axis parallel to the propagation direction of light from said diode-lasers and having mutually perpendicular fast and slow axes corresponding to said fast and slow axes of said diode-lasers;
   said optical system further including one or more arrays of microlenses, said one or more arrays of microlenses providing two arrays of cylindrical refracting surfaces and being located between said first anamorphic lens and said lens group, said arrays of cylindrical refracting surfaces having a pitch defined as the distance between vertices of adjacent ones of said cylindrical surfaces, the pitch of said arrays of cylindrical refracting surfaces being different from the spacing between said diode-lasers and said cylindrical refracting surfaces being arranged such that each thereof receives rays from a plurality of said diode-lasers and such that rays leaving said one or more microlens arrays arrive at said lens group as rays diverging in both said fast and slow axes; and
   said lens group being arranged to focus said fast-axis diverging rays from said one or more microlens arrays in a focal plane perpendicular to said longitudinal optical axis, and arranged to form said slow axis diverging rays from said one or more microlens arrays into a plurality of converging bundles of parallel rays each thereof including rays from a plurality of diode-lasers, said converging bundles of parallel rays intersecting in said focal plane, whereby light from said diode-lasers is formed into a line of light about in said focal plane, said line of light having a width in said fast axis and a length in said slow axis.

2. The apparatus of claim 1, wherein each of said first and second anamorphic lenses of said optical system has greater optical power in the fast axis than in the slow axis.

3. The apparatus system of claim 2, wherein each of said first and second anamorphic lenses of said optical system has positive optical power in the fast axis and zero optical power in the slow axis.

4. The apparatus system of claim 3, wherein each of said microlenses in said at least one microlens array have zero optical power in the fast axis and positive optical power in the slow axis.

5. The apparatus system of claim 1, wherein there is only one microlens array and each of said microlenses in said microlens array has first and second cylindrical surfaces.

6. The apparatus system of claim 1, wherein there are two microlens arrays and each of said microlenses in said microlens array has a plane first surface and cylindrical second surface.

7. The apparatus system of claim 1, wherein said spherical lens group is a single element lens.

8. The apparatus of claim 1, wherein said spherical lens of said lens group is a multiple element lens.

9. The apparatus of claim 1, wherein said spherical lens of said lens group precedes said second anamorphic lens in the direction of propagation.

10. The apparatus of claim 1, wherein said second anamorphic lens precedes said spherical lens of said lens group in the direction of propagation.

11. The apparatus of claim 1, wherein the pitch of said microlens array is greater than the spacing of diode-lasers in said diode-laser array.

12. The apparatus of claim 1, wherein said arrays of cylindrical refracting surfaces are designated as first and second arrays in the direction of propagation and have equal pitch, said arrays of cylindrical refracting surfaces being further arranged such that each cylindrical refracting surface in said second array thereof forms an image of a corresponding cylindrical refracting surface in said first array thereof at infinity.

13. An illumination apparatus for projecting a line of light, comprising:
   a plurality of diode-lasers each thereof having an emitting-aperture and arranged in an elongated linear array thereof, said diode-lasers being spaced apart by a spacing defined as the distance between the centers of adjacent ones thereof;

said linear diode-laser array having a slow axis parallel to the length direction thereof, and a fast axis perpendicular to said slow axis, light being emitted from each of said diode-lasers from an emitting aperture thereof as diverging rays in both said fast and slow axes in a general direction of propagation mutually perpendicular to both said fast and slow axes;

an optical system, said optical system including a first cylindrical lens, and a lens group including a second cylindrical lens and a spherical lens having positive optical power, said optical system having a longitudinal axis parallel to the propagation direction of light from said diode-lasers and having mutually perpendicular fast and slow axes corresponding to said fast and slow axes of said diode-lasers;

said optical system further including an array of microlenses, said array of microlenses providing two arrays of cylindrical refracting surfaces and being located between said first cylindrical lens and said lens group, said arrays of cylindrical refracting surfaces having a pitch defined as the distance between vertices of adjacent ones of said cylindrical surfaces, the pitch of said arrays of cylindrical refracting surfaces being different from the spacing between said diode-lasers and said cylindrical refracting surfaces being arranged such that each thereof receives rays from a plurality of said diode-lasers and such that rays leaving said microlens array arrive at said lens group as rays diverging in both said fast and slow axes; and said lens group being arranged to focus said fast-axis diverging rays from said microlens array in a focal plane perpendicular to said longitudinal optical axis, and arranged to form said slow axis diverging rays from said microlens array into a plurality of converging bundles of parallel rays each thereof including rays from a plurality of diode-lasers, said converging bundles of parallel rays intersecting in said focal plane, whereby light from said diode-lasers is formed into a line of light about in said focal plane, said line of light having a width in said fast axis and a length in said slow axis.

14. The illumination apparatus of claim 13, wherein said arrays of cylindrical refracting surfaces are designated the first and second arrays numbered in the direction of propagation of light through the illumination apparatus and wherein the pitch of said cylindrical refracting surfaces in each of said arrays thereof is the same and each cylindrical refracting surface in said second array thereof is optically spaced by the focal length of said cylindrical refracting surface from a corresponding cylindrical refracting surface in said first array thereof.

15. An illumination apparatus for projecting a line of light, comprising:

a plurality of diode-lasers each thereof having an emitting-aperture and arranged in an elongated linear array thereof, said diode-lasers being spaced apart by a spacing defined as the distance between the centers of adjacent ones thereof;

said linear diode-laser array having a slow axis parallel to the length direction thereof, and a fast axis perpendicular to said slow axis, light being emitted from each of said diode-lasers from an emitting aperture thereof as diverging rays in both said fast and slow axes in a general direction of propagation mutually perpendicular to both said fast and slow axes;

an optical system, said optical system including a first cylindrical lens, and a lens group including a second cylindrical lens and a spherical lens having positive optical power, said optical system having a longitudinal axis parallel to the propagation direction of light from said diode-lasers and having mutually perpendicular fast and slow axes corresponding to said fast and slow axes of said diode-lasers;

said optical system further including two arrays of plano convex microlenses, providing two arrays of cylindrical refracting surfaces and being located between said first cylindrical lens and said lens group, said arrays of cylindrical refracting surfaces having a pitch defined as the distance between vertices of adjacent ones of said cylindrical surfaces, the pitch of said arrays of cylindrical refracting surfaces being different from the spacing between said diode-lasers and said cylindrical refracting surfaces being arranged such that each thereof receives rays from a plurality of said diode-lasers and such that rays leaving said microlens arrays arrive at said lens group as rays diverging in both said fast and slow axes; and said lens group being arranged to focus said fast-axis diverging rays from said microlens array in a focal plane perpendicular to said longitudinal optical axis, and arranged to form said slow axis diverging rays from said microlens arrays into a plurality of converging bundles of parallel rays each thereof including rays from a plurality of diode-lasers, said converging bundles of parallel rays intersecting in said focal plane, whereby light from said diode-lasers is formed into a line of light about in said focal plane, said line of light having a width in said fast axis and a length in said slow axis.

16. The illumination apparatus of claim 15, wherein said arrays of cylindrical refracting surfaces are designated the first and second arrays numbered in the direction of propagation of light through the illumination apparatus and wherein of the pitch of said cylindrical refracting surfaces in each of said arrays thereof is the same and each cylindrical refracting surface in said second array thereof is optically spaced by the focal length of said cylindrical refracting surface from a corresponding cylindrical refracting surface in said first array thereof.

17. An illumination apparatus for projecting a line of light, comprising:

a plurality of diode-lasers each thereof having an emitting-aperture and arranged in an elongated linear array thereof, said diode-lasers being spaced apart by a spacing defined as the distance between the centers of adjacent ones thereof;

said linear diode-laser array having a slow axis parallel to the length direction thereof, and a fast axis perpendicular to said slow axis, light being emitted from each of said diode-lasers from an emitting aperture thereof as diverging rays in both said fast and slow axes in a general direction of propagation mutually perpendicular to both said fast and slow axes;

an optical system, said optical system including a first cylindrical lens, and a lens group including a second cylindrical lens and a spherical lens having positive optical power, said optical system having a longitudinal axis parallel to the propagation direction of light from said diode-lasers and having mutually perpendicular fast and slow axes corresponding to said fast and slow axes of said diode-lasers, and said first and second cylindrical lenses having positive optical power in said fast axis and zero optical power in said slow axis;

said optical system further including first and second arrays of cylindrical refracting surfaces located between said first cylindrical lens and said lens group, said arrays being numbered in the direction of propagation of light through the illumination apparatus;

said arrays of cylindrical refracting surfaces having a pitch defined as the distance between vertices of adjacent ones of said cylindrical surfaces, the pitch of each of said arrays of cylindrical refracting surfaces being the same and being different from the spacing between said diode-lasers, each cylindrical refracting surface in said second array thereof being optically spaced by the focal length of said cylindrical refracting surface from a corresponding cylindrical refracting surface in said first array thereof.

said cylindrical refracting surfaces being arranged with respect to said first cylindrical lens such that each thereof receives rays from a plurality of said diode-lasers and such that rays leaving said second array of cylindrical refracting surfaces arrive at said lens group as rays diverging in both said fast and slow axes; and said lens group being arranged to focus said fast-axis diverging rays from said second array of cylindrical refracting surfaces in a focal plane perpendicular to said longitudinal optical axis, and arranged to form said slow axis diverging rays from said second array of cylindrical refracting surfaces into a plurality of converging bundles of parallel rays each thereof including rays from a plurality of diode-lasers, said converging bundles of parallel rays intersecting in said focal plane, whereby light from said diode-lasers is formed into a line of light about in said focal plane, said line of light having a width in said fast axis and a length in said slow axis.

18. The illumination system of claim 17, wherein said spherical lens precedes said second cylindrical lens in the direction of propagation of light through the illumination apparatus.

19. The illumination system of claim 17, wherein said second cylindrical lens precedes said spherical lens in the direction of propagation of light through the illumination apparatus.

* * * * *